(12) United States Patent
Takehara et al.

(10) Patent No.: US 8,264,195 B2
(45) Date of Patent: Sep. 11, 2012

(54) NETWORK TOPOLOGY FOR MONITORING AND CONTROLLING A SOLAR PANEL ARRAY

(75) Inventors: Toru Takehara, Foster City, CA (US); Shinichi Takada, Fremont, CA (US)

(73) Assignee: Paceco Corp., Hayward, CA (US)

( * ) Notice: Subject to any disclaimer, the term of this patent is extended or adjusted under 35 U.S.C. 154(b) by 510 days.

(21) Appl. No.: 12/243,890

(22) Filed: Oct. 1, 2008

(65) Prior Publication Data

US 2010/0082171 A1   Apr. 1, 2010

(51) Int. Cl.
 *H02J 7/00* (2006.01)
(52) U.S. Cl. ........................................................ 320/101
(58) Field of Classification Search .................. 320/101
 See application file for complete search history.

(56) References Cited

U.S. PATENT DOCUMENTS

| | | | |
|---|---|---|---|
| 5,682,305 A | 10/1997 | Kurokami et al. | |
| 5,838,148 A | 11/1998 | Kurokami et al. | |
| 5,869,956 A | 2/1999 | Nagao et al. | |
| 5,923,158 A | 7/1999 | Kurokami et al. | |
| 6,243,413 B1 * | 6/2001 | Beukema ............... | 375/222 |
| 6,311,137 B1 | 10/2001 | Kurokami et al. | |
| 6,747,372 B2 | 6/2004 | Gilbreth et al. | |
| 6,911,593 B2 * | 6/2005 | Mazumder et al. ........... | 136/251 |
| 7,013,203 B2 | 3/2006 | Moore et al. | |
| 7,309,850 B2 | 12/2007 | Sinton et al. | |
| 2002/0038667 A1 * | 4/2002 | Kondo et al. ............... | 136/293 |
| 2003/0045949 A1 * | 3/2003 | Stone et al. ................ | 700/61 |
| 2004/0164704 A1 * | 8/2004 | Yang .......................... | 320/104 |
| 2008/0100258 A1 * | 5/2008 | Ward .......................... | 320/101 |
| 2008/0129120 A1 * | 6/2008 | Su et al. ...................... | 307/80 |

* cited by examiner

*Primary Examiner* — Arun Williams
(74) *Attorney, Agent, or Firm* — GSS Law Group (57) ABSTRACT

Embodiments of a network topology for monitoring and controlling an array of solar panels include an intelligent node adapted to send and receive data and commands by at least two redundant means of communication. An intelligent node includes a solar panel, a node controller, a photovoltaic module, a bypass relay, a bypass bus, PLC and wireless communication interfaces for redundant means of communication, and sensor and actuator interfaces for monitoring and controlling the intelligent node. A PV module in the intelligent node may selectively be bypassed without interrupting network communications. Some embodiments include a plurality of intelligent nodes electrically connected serially into a chain of nodes and further connected to a gateway. Other embodiments include a plurality of chains of nodes connected to an inverter and a transformer, thereby defining an area. Additional embodiments further include a central server in communication with a plurality of areas.

31 Claims, 6 Drawing Sheets

NETWORK TOPOLOGY FOR MONITORING AND CONTROLLING A SOLAR PANEL ARRAY

FIELD OF THE INVENTION

The present invention relates generally to a network topology for monitoring and controlling solar panels and more specifically to a network topology for monitoring and controlling a solar panel array comprising a large number of photovoltaic modules.

BACKGROUND

Large arrays of solar panels have been installed for utility-scale electric power generation in several locations around the world. For example, an array of solar panels in Bavaria, Germany comprising more than 57,000 photovoltaic (PV) modules covers an area of almost 62 acres (25 square kilometers) and generates approximately 10 megawatts of electrical power. Another solar power system in Nevada in the U.S. will have approximately 70,000 PV modules over an area of about 140 acres (57 square kilometers). As the efficiency and reliability of solar panels increase and installed costs decrease, large arrays of solar panels are expected to become more common sources of electrical power.

Some solar panels include an energy conversion apparatus for converting sunlight into another form of energy. Other panels comprise reflective optical elements, transmissive optical elements, or a combination of transmissive and reflective elements to concentrate incident sunlight onto an energy conversion apparatus, which may alternatively be attached to the solar panel or be separated from the solar panel. For example, a solar panel may include one or more PV modules for converting sunlight into electricity. A PV module comprises many relatively small solar cells connected together in a series electrical circuit. In bright sunlight, a PV module may output up to a few hundred watts of direct-current (DC) electrical power at a voltage from about 12 volts DC to about 50 volts DC, depending on the panel design. The output from an individual PV module may be combined with the outputs from other PV modules in a series electrical circuit for efficient power transmission.

Figure 6:
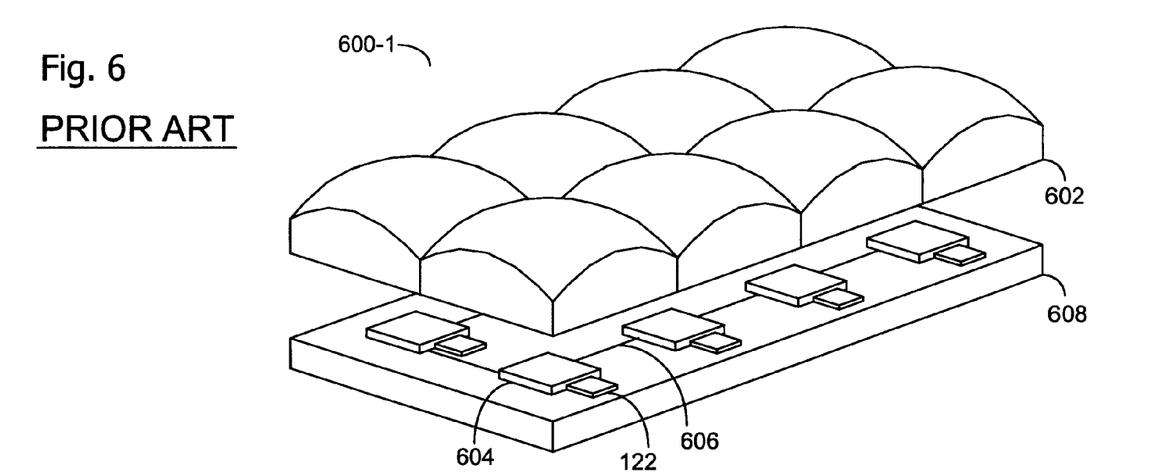

A solar panel having one or more PV modules may further include optical elements for concentrating sunlight incident upon a relatively large surface of the solar panel onto a solar cell having a relatively small surface, or alternatively onto a plurality of solar cells electrically connected in series. Such a PV module, referred to as a concentrating photovoltaic module (CPV), may operate with higher energy efficiency than a system without optical elements for concentrating sunlight. An example of a CPV module is shown in the prior-art illustration of FIG. 6. In FIG. 6, a pictorial view of a small segment of a first example of a CPV module 600-1 includes a plurality of lenses 602 arranged in rows and columns above a plurality of solar cells 604 attached to a substrate 608. The substrate 608 provides structural support for other components in the CPV module 600-1 and may further include structures for dissipating heat. A solar cell 604 is positioned close to a focal point for a lens 602. Adjacent solar cells are connected in series with an electrical conductor 606.

Figure 7:
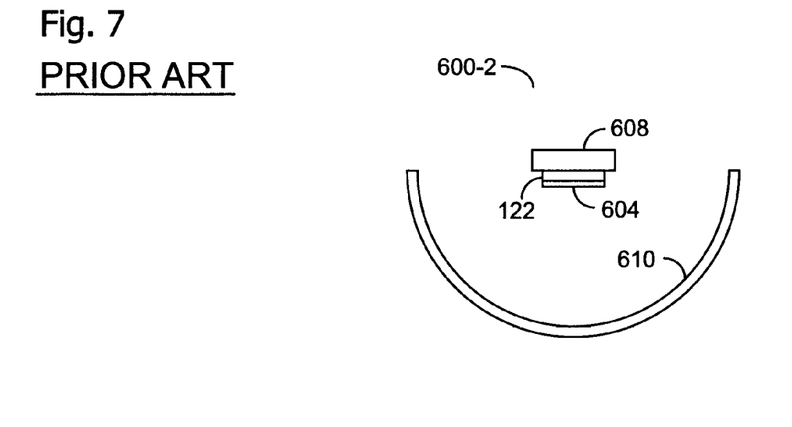

Another example of a CPV module is shown in the prior-art illustration of FIG. 7. FIG. 7 is a partial end view of a CPV module 600-2 comprising a reflector 610 which directs incident sunlight onto a surface of a solar cell 604 positioned close to an optical focus of the reflector 610. The solar cell 604 is attached to a substrate 608 for structural support. Some CPV modules include a plurality of solar cells 604, each one dispositioned near the optical focus of a corresponding plurality of cup-shaped reflectors 610. Other CPV include a plurality of solar cells 604 dispositioned along an optical focus of a trough-shaped reflector 610. Many variations of lens and reflector designs are found in CPV modules known in the art.

Directing too much sunlight onto a solar cell may damage the solar cell by overheating it. Therefore, a PV module may include a device for measuring the temperature of a solar cell. A PV module may include many temperature measurement devices to detect hot spots in the module. An operator of a solar power system may choose to turn a solar panel away from the sun to lower the temperature of a PV module in which a hot spot is detected. CPV modules in particular must be monitored for hot spots since sunlight collected from a relatively large collecting surface is focused onto a relatively small solar cell. In the prior-art illustrations of FIG. 6 and FIG. 7, a temperature measurement device 122 is thermally coupled to a solar cell 604. Temperature sensors may be attached to many solar cells as shown. An output signal from the temperature measurement device is monitored by a system operator to detect a temperature above a safe operating limit in a solar cell 604. In a large solar panel, it may be necessary to monitor temperatures at many locations within a PV module.

In order to increase power generation, a mechanical positioning system may be used to rotate a solar panel in azimuth and elevation to track the sun along its path across the daytime sky. For example, a solar panel having an attached PV module may be rotated so that a sunlight-absorbing surface of the PV module is perpendicular to rays of sunlight throughout daylight hours. Or, a solar panel comprising one or more mirrors may be rotated so as to direct sunlight onto a separate PV module which remains in a fixed position relative to the sun. A solar panel adapted to track the sun's position and direct reflected sunlight onto a target is referred to as a heliostat. In some solar power systems, a PV module receives sunlight reflected from more than one heliostat.

Measured values of azimuth angle and elevation angle may be transmitted from a solar panel through a communications network to a central location for review by a management and control system and a system operator. Other parameters related to solar panel efficiency, operating conditions, and fault conditions, for example temperatures measured for solar cells in a PV module, may also be sent to the central management and control system, referred to as a central server. Commands from the central server may also be sent over the communications network to equipment connected to or located near a solar panel, for example position adjustment commands sent to a mechanical positioning system.

A plurality of serial chains of solar panels connected in parallel for input to an inverter and a power transformer is referred to as an area. The solar panels within one area are generally located in relatively close physical proximity to one another. A solar power plant may comprise several areas to achieve a preferred electrical power generating capacity. Large solar power plants occupy a substantial expanse of land, as in the examples of solar power plants in Bavaria and Nevada. For solar power plants comprising many areas, areas that have many solar panels each, or where there is a substantial distance separating one area from another, each area may have its own server, referred to as a gateway, for accumulating data from solar panels in an area and transmitting accumulated data to the central server. A gateway may also distribute commands from the central server to solar panels in an area served by the gateway.

In order to exchange data and commands with a central server and one or more gateways, a solar panel is part of a node in a communications network linking nodes to other nodes, nodes to a gateway, and gateways to a central computer. As the number of nodes increases, the cost of establishing reliable communications connections between the nodes increases. Furthermore, as the number of components used in the communications network increases, the reliability of the network decreases. While there are many different network topologies for communications related to monitoring and control known in the art, none of the known topologies are optimum for monitoring and control of large numbers of solar panels distributed over large expanses of land. For example, connecting solar panels to each other and to a gateway in a solar panel array covering many acres (thousands of square meters) with point-to-point wiring such as electrical cable or optical fiber is very expensive to install and maintain. Such wiring must be protected from mechanical damage, for example damage from service vehicles driving over the wiring, and may further need to be isolated from sources of electrical interference such as inverters, transformers, transmission cables, electrical storms, electrical switchgear, vehicle ignition systems, computer systems, and so on.

Another method known in the art for establishing communications between nodes in a control and monitoring network is referred to as power line communications (PLC). PLC technology includes interface circuits for coupling data to be transmitted from a data source onto an electrical power transmission line. Transmitted data is decoupled from the power transmission line at a data destination by a receiving circuit that isolates the equipment receiving the data from damage by voltage and current on the power transmission line. An advantage of a PLC system is that separate wiring is not required for power transmission and communications. However, communications over a PLC system may be degraded or disrupted by some of the same sources of electrical interference described for point-to-point wiring solutions.

Wireless technology is another widely used method for establishing communications links between nodes in a network. Both short range and long range wireless communications technologies, for example the short range technology popularly referred to as "Bluetooth" and the longer range technology popularly referred to as "Wifi", may be adapted to exchange data and commands between nodes and a central server. However, intervening terrain or buildings, temporary obstructions such as service equipment, solar panels or their metal support structures, and sources of electrical interference, some of which have already been noted, may interfere with wireless communications. Furthermore, wireless technologies are generally not able to be expanded to include thousands of nodes within range of a single wireless network access point, for example a gateway communicating with hundreds or thousands of solar panels in an area in a solar power plant. It may be possible to increase the number of wireless access points to add capacity for more nodes, but because of the close proximity of large numbers of panels, the wireless access points may then be close enough to interfere with each other. Preventing such interference by, for example, assigning different frequencies to different wireless access points may still result in a maximum number of wireless connections that is less than the number of nodes needed for a large solar panel array.

Each networking technology known in the art has limitations that either reduce scalability to large numbers of nodes or which may result in network communications errors under conditions which may be expected to occur during the operation of a large solar panel array. For example, should any one panel in a serially connected chain of panels fail, for example by the failure of a solar cell within a PV module or by a failure in an electrical connection between solar panels, not only may output from the failed panel be interrupted, but output from other panels preceding the failed panel in the serial chain may be interrupted. Also, communication of data and commands may be disrupted, for example data and commands carried in a PLC system over electrical power connections between nodes. Loss of network communications interrupts monitoring and control of the solar panel array and may also result in an interruption of electrical power service from a solar power plant.

What is needed is a network topology for controlling and monitoring solar panels that is scalable from arrays comprising a few solar panels to arrays comprising hundreds of thousands of solar panels. What is also needed is a network topology that includes redundant communications pathways so that interruption of a communications pathway through a node does not result in a loss of monitoring or control of other nodes. What is further needed is a network topology that is able to bypass solar panels that have malfunctioned and maintain electric power flow from and communications with other solar panels.

SUMMARY

The present invention comprises a network topology for controlling an array of solar panels. A network topology in accord with an embodiment of the invention comprises an intelligent node adapted to exchange data and commands with an external communication controller such as a gateway or central server. The intelligent node includes a network controller, a solar panel, a bypass relay adapted to change a switching state according to a command received by the intelligent node, a bypass bus, and interface circuits for at least two redundant means of communication.

In some embodiments, a solar panel includes a PV module and the solar power panel and PV module may be moved together to track the sun. In other embodiments, the PV module is mechanically separate from the solar panel, that is, the solar panel tracks the sun and the PV module remains in a fixed position. A combination of a solar panel, one or more measurement circuits for monitoring the solar panel, an azimuth motor, and an elevation motor is referred to herein as a concentrator. Some embodiments include more than one concentrator for directing sunlight onto one PV module.

An intelligent node further includes an input terminal connected to an input terminal on the PV module and an output terminal connected to an output terminal on the bypass relay. An output terminal of the PV module is electrically connected to a first switched terminal on the bypass relay. An electrical circuit for measuring current may optionally be placed in series electrical connection on a line between the output terminal on the PV module and the first switched terminal on the bypass relay. An electrical circuit for measuring voltage may optionally be connected to a line from the output terminal of the PV module. A bypass bus is electrically connected from the input terminal on the intelligent node to a second switched terminal on the bypass relay.

A command received by an intelligent node from an external monitoring and control system, for example a central server, selectively causes the bypass relay to change from one switching state to another switching state. In a first switching state, voltage and current input to the intelligent node input terminal are added to voltage and current output by the PV module, and the combined current and voltage is electrically coupled to the first switched terminal in the bypass relay for output on the intelligent node output terminal. In a second switching state, voltage and current input to the intelligent node input terminal are coupled to the second switched terminal on the bypass relay by the bypass bus for output on the intelligent node output terminal, thereby bypassing the voltage and current output from the PV module.

An intelligent node includes a node controller adapted to receive signals from measurement circuits and output data related to solar panel performance and status on one or communications interfaces. The node controller may optionally output electrical signals for controlling actuators such as electric motors for changing solar panel azimuth and elevation. The node controller also exchanges data and commands with a gateway, a server, or other intelligent nodes by at least two redundant means of communications. In a preferred embodiment, the two redundant means of communication are power line communication (PLC) and wireless communication. A wireless communication transceiver in an intelligent node may alternately be a transceiver for short range or long range wireless communication.

An embodiment of a network topology in accord with the invention optionally includes a plurality of intelligent nodes connected in series, with an input terminal of an intelligent node connected to an output terminal of a next sequential intelligent node, thereby forming a chain of intelligent nodes. An embodiment may optionally be expanded to include a plurality of chains of intelligent nodes electrically connected in parallel, or alternately into a tree structure, with an output from each chain of intelligent nodes electrically connected to a gateway for an area and further electrically connected to an inverter and a transformer. An area of the network includes all of the intelligent nodes in communication with one gateway. An embodiment may further include a central server adapted to exchange data and commands with one or more areas. In a preferred embodiment, communications between gateways and a central server occur over wireless communications channels.

This section summarizes some features of the present invention. These and other features, aspects, and advantages of the embodiments of the invention will become better understood with regard to the following description and upon reference to the following drawings, wherein:

BRIEF DESCRIPTION OF THE DRAWINGS

FIG. 4 is a block diagram of an example of a network topology comprising a plurality of the intelligent nodes of FIGS. 1-3, a gateway, an optional inverter, and an optional transformer. FIG. 4 further illustrates the boundaries of an area in a network topology in accord with the invention.

FIG. 6 is a simplified pictorial representation of an example of a PV module known in the art as a CPV module. FIG. 6 shows a small portion of a complete CPV module comprising an array of lenses positioned above a corresponding array of solar cells. FIG. 6 further illustrates temperature measurement devices arranged to monitor solar cell temperatures. (PRIOR ART)

FIG. 7 is an end view of another example of a CPV module. The CPV module in the example of FIG. 7 comprises a solar cell positioned near an optical focus of a reflector. FIG. 7 further illustrates an example of a temperature measurement device arranged to monitor a temperature of the solar cell. (PRIOR ART)

DESCRIPTION

Embodiments a network topology for monitoring and controlling a large array of solar panels include an intelligent node adapted to transmit and receive data and commands by at least two redundant means of communication. An intelligent node in accord with an embodiment of the invention includes a solar panel, a PV module, a node controller, a bypass relay, and a bypass bus. Some embodiments include a plurality of intelligent nodes electrically connected into a serial chain and further electrically connected to a gateway. Yet other embodiments include a plurality of serial chains electrically connected in parallel and having a combined output electrically connected to a gateway and optionally connected to an inverter and a transformer, thereby defining the boundaries of an area of the network. Additional embodiments further include a central server in communication with a plurality of areas. Embodiments of the invention are scalable from a small number of intelligent nodes to very large arrays of 500,000 or more intelligent nodes organized into a plurality of areas. Embodiments are well suited to applications requiring reliable control and monitoring in order to minimize service interruptions, for example a solar power plant.

Figure 1:
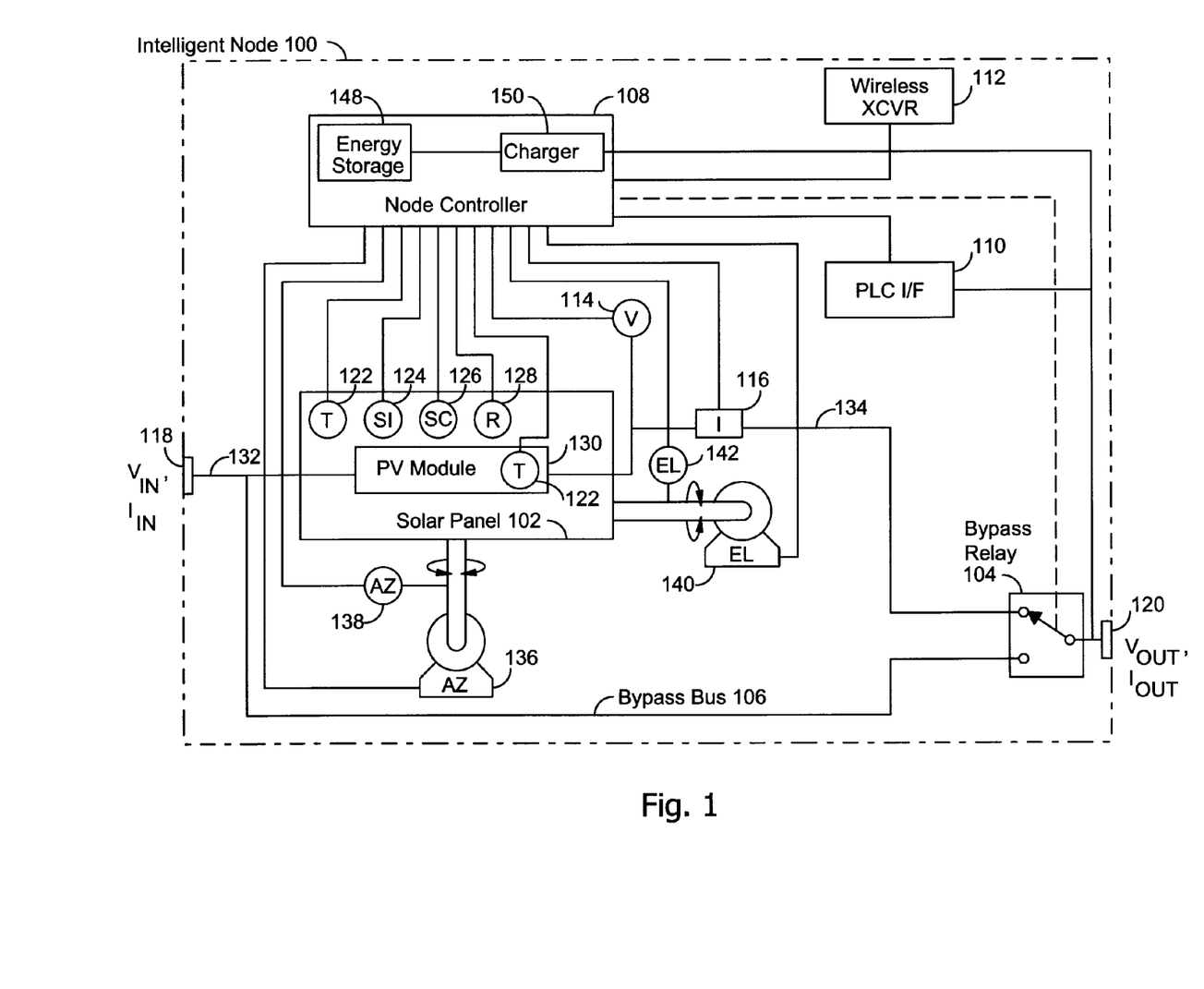
FIG. 1 is a block diagram of an example of an intelligent node, a repeated element in a network topology in accord with an embodiment of the invention. In the embodiment of FIG. 1, a PV module is part of a solar panel.

An intelligent node is a basic repeated element in a network topology in accord with an embodiment of the invention. An example of an intelligent node is shown in the example of FIG. 1. In the block diagram of FIG. 1, an intelligent node 100 comprises a solar panel 102 which includes a PV module 130. An input to the PV module 130 is electrically connected to an input line 132 connected to an input terminal 118 for the intelligent node 100. An optional voltage measuring circuit V 114 measures a voltage output of the PV module 130. An output line 134 from the PV module 130 is electrically connected to a first switched terminal on a bypass relay 104. An optional current measuring circuit I 116 in series with the PV module output line 134 measures an output current from the PV module 130. An output terminal from the bypass relay 104 is electrically connected to an output terminal 120 for the intelligent node 100.

The intelligent node 100 further includes a bypass bus 106 for routing power, data, and commands from adjacent nodes around the PV module 130. Routing power, data, and commands from adjacent nodes from the input terminal 118 of the intelligent node 100 to the output terminal 120 of the intelligent node 100 may be desirable, for example, if the PV module 130 performs poorly, malfunctions, or is undergoing inspection or maintenance. Poor PV module performance may result from, for example, dirt, water, or other foreign material on a surface of the solar panel 102 or a surface of the PV module 130, shadows from clouds, buildings, or trees, aging of power conversion elements in the PV module, damage from hail or thermal stress, or an electrical fault.

A command received by the intelligent node 100 selectively causes the bypass relay 104 to change switching state. In a first switching state, voltage and current input to the intelligent node input terminal 118, combined with voltage and current output by the PV module 130, are connected from a first switched terminal on the bypass relay 104 to an output terminal on the bypass relay 104. In a second switching state, voltage and current input on the input terminal 118 and carried by the bypass bus 106 are connected from a second switched terminal on the bypass relay 104 to the output terminal of the bypass relay 104. The output terminal of the bypass relay 104 is electrically connected to the intelligent node output terminal 120. When the bypass relay 104 is in its first switching state, electrical power generated by the PV module 130 contributes to the voltage and current output from the intelligent node 100 on the output terminal 120. When the bypass relay is in its second switching state, electrical power from the PV module 130 is excluded from the voltage and current output from the intelligent node 100. In either switching state, electrical power, data, and commands received at the intelligent node input terminal 118 are coupled to the intelligent node output terminal 120.

In a preferred mode of operation, a command received by the intelligent node 100 to bypass the PV module 130 and connect voltage and current from the input terminal 118 to the output terminal 120 originates in a central server. Activation of the bypass relay 104 from a central server is preferred for reasons of efficiency and optionally safety. It is preferred, for example, for a human operator or optionally an algorithm operating on the central server to review data associated with the performance of the PV module 130 before activating the bypass relay 104 to connect, or alternately to disconnect, the bypass bus 106 to an output terminal 120 in a particular intelligent node 100. Such activation may be desirable when an event affects an area or part of an area in a large array of intelligent nodes, for example planned maintenance of one or more intelligent nodes. Or, an operator or an algorithm operating on the central server may choose to ignore the event, for example a transient event, a failure in one but not all redundant means of communication in the network, or a problem which may quickly be resolved, and permit the intelligent node to continue contributing electrical power.

An intelligent node 100 includes a node controller adapted for communication with other nodes, a gateway, or a central server. A node controller may comprise, for example but not limited to, an electrical circuit comprising a plurality of discrete circuit components, a programmable logic array, a gate array, an application-specific integrated circuit, or a microprocessor or microcontroller with associated support circuits. The node controller 108 of FIG. 1 transmits and receives data and commands by at least two redundant means of communication. An example of a means of communication shown in the embodiment of FIG. 1 is a power line communication interface (PLC I/F) 110 electrically connected to a bidirectional communication port of the node controller 108 and electrically coupled through isolation circuitry included in the PLC interface 110 to a line to the output terminal 120 of the intelligent node 100.

Another example of a means of communication shown in FIG. 1 is a wireless communication interface comprising a wireless transceiver (XCVR) 112. The wireless XCVR 112 is electrically connected to a bidirectional communication port on the node controller 108 and exchanges signals representative of data and commands with other wireless transceivers, for example wireless transceivers in other intelligent nodes or gateways. Under some circumstances, for example when a gateway is not in operation, an intelligent node may optionally exchange data and commands by wireless communication with a central server. A wireless transceiver 112 adapted for short range communication, for example a Bluetooth transceiver, may be included in the intelligent node 100. Alternatively, a transceiver for long range communication may be included, for example a Wifi transceiver or a transceiver using other wireless communication technology.

The node controller 108 may optionally include at least one sensor interface and optionally at least one actuator interface monitoring and controlling the solar panel 102 and the PV module 130. For example, the node controller may be connected to an output of the voltage measurement circuit 114, thereby enabling the node controller to report over the network a value related to a magnitude of output voltage of the PV module 130. Another connection between an output of the current measurement circuit 116 and the node controller 108 enables reporting of a value related to a magnitude of output current from the PV module 130. A plurality of other measurement devices may further be electrically connected with the node controller 108. Examples of measurement devices shown in FIG. 1 include one or more temperature measurement devices T 122 for measuring temperatures on the solar panel 102 and optionally on the PV module 130, a device SI 124 for measuring an intensity of solar light incident upon a surface of the solar panel 102 or optionally a surface of the PV module 130, a device SC 126 for measuring a value related to surface cleanliness of the solar panel 102, and a device R 128 for measuring reflectance from a surface of the solar panel 102 or PV module 130.

In addition to measurement devices for electrical parameters, embodiments may optionally include measurement devices and actuators for mechanical parameters such as a device AZ 138 for measuring an azimuth angle of the solar panel 102 and a device EL 142 for measuring an elevation angle of the solar panel 102. The node controller 108 also includes a relay control output terminal electrically connected to a control input terminal on the bypass relay 104. In some embodiments, an output of the node controller 108 is connected electrically to an interface circuit for an actuator and is able to control a motion or other action performed by an actuator. In the example of FIG. 1, an output of the node controller 108 is electrically connected to a control input on an azimuth motor AZ 136. Another output of the node controller 108 is electrically connected to a control input on an elevation motor EL 140. A mechanical linkage connects the azimuth motor AZ 136 to the solar panel 102. The node controller sends a signal to the azimuth motor AZ 136 to adjust an azimuth angle of the solar panel 102. The elevation motor EL 140 is similarly connected to the node controller and solar panel to adjust an elevation angle of the solar panel.

Figure 2:
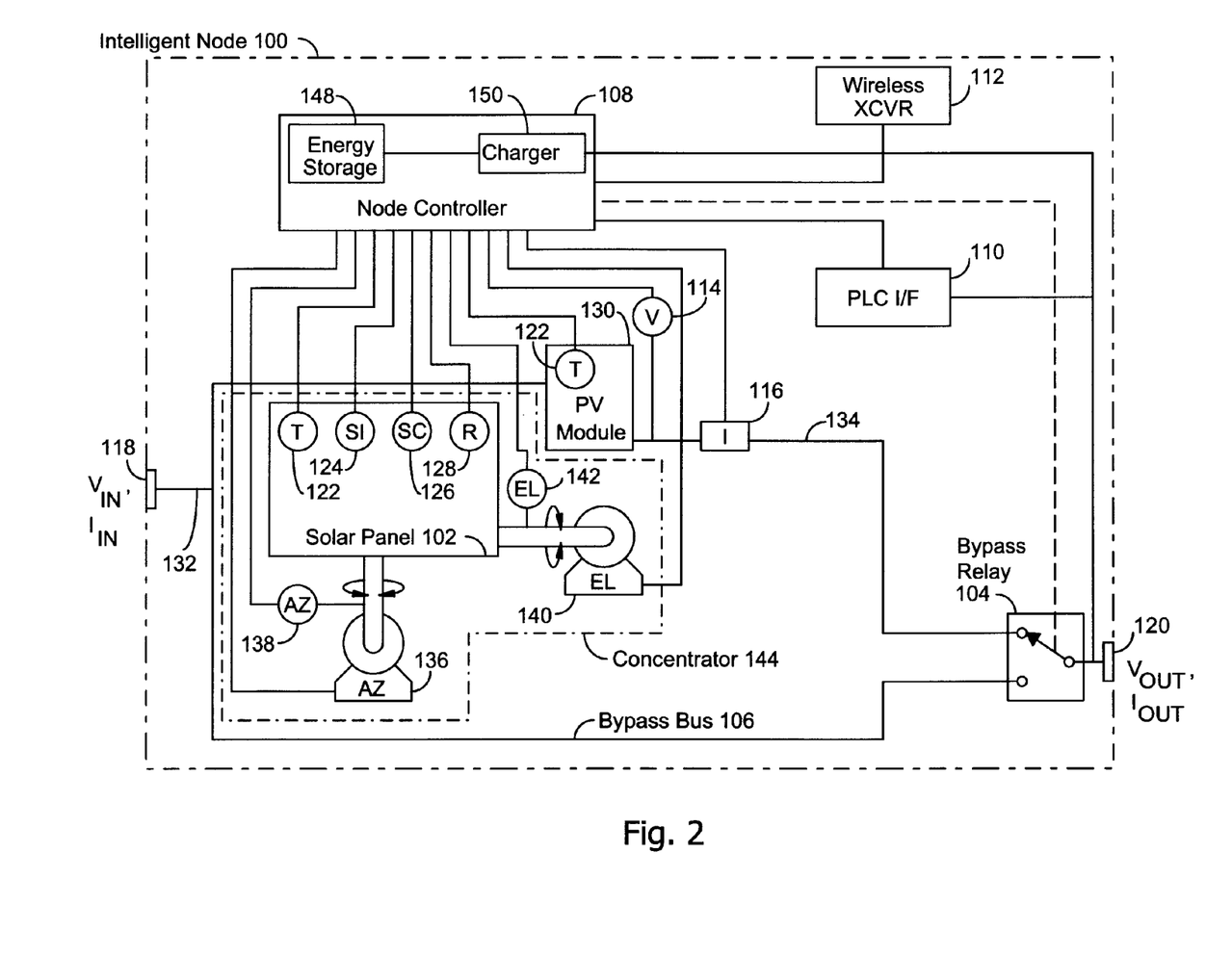
FIG. 2 is a block diagram of another example of an intelligent node. In the embodiment of FIG. 2, a PV module is separate from a solar panel, that is, the solar panel may be adjusted to track the sun's position while the PV module remains in a fixed position.

In the example of FIG. 1, a PV module is included as part of the solar panel. In other embodiments, a PV module is separate from the solar panel, that is, the solar panel may be driven in azimuth and elevation to track the sun's position, but the PV module remains in a fixed position. FIG. 2 shows an embodiment in which a solar panel 102 and a PV module 122 are separated. Placing a PV module in a selected location and a solar panel some distance away in another location may reduce costs associated with mechanical support structures or enable a PV module to receive sunlight from more than one solar panel, either to provide redundancy in a solar power system or to increase power output from a PV module.

An example of an intelligent node having a PV module separate from a solar panel is shown in the example of FIG. 2. In the example of FIG. 2, electrical connections between measurement devices and the node controller 108 and between actuators and the node controller are as described for the example of FIG. 1. Electrical connections between the PV module 122, intelligent node input 132, bypass relay 104, and intelligent node output 120 are also as described for the example of FIG. 1, as are communications connections between a wireless transceiver 112 and the node controller 108 and a PLC interface 110 and the node controller. In general, the topology of electrical connections between elements shown in FIG. 1 is the same as the topology of electrical connections between corresponding elements in FIG. 2.

Figure 3:
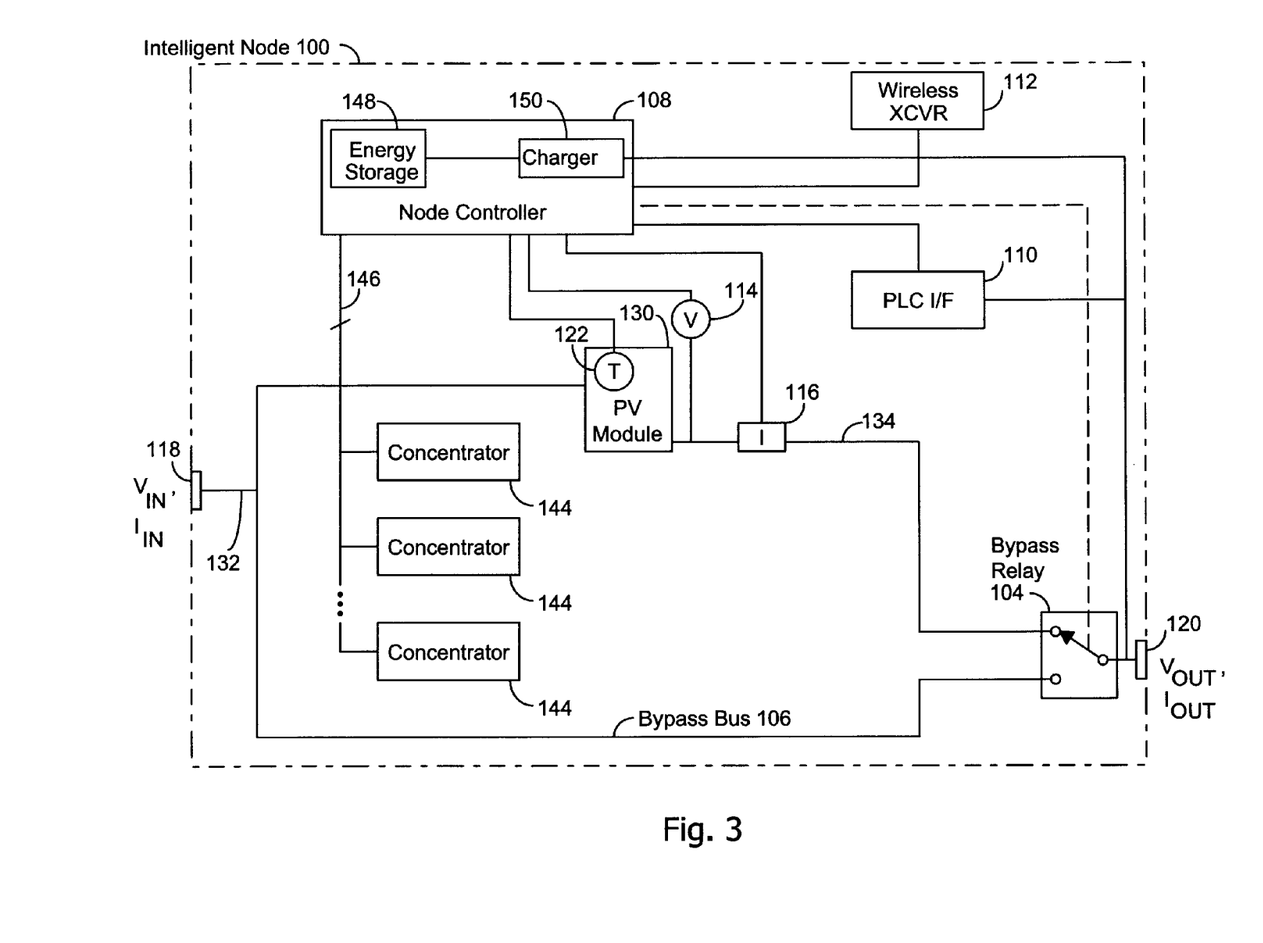
FIG. 3 is a block diagram of an embodiment of an intelligent node comprising a plurality of concentrators for directing sunlight onto a PV module.

An intelligent node may optionally be configured with more than one solar panel, each panel functioning as a heliostat. Alternatively, a solar panel may include more than one heliostat. FIG. 3 shows an example of an embodiment comprising more than one concentrator 144 for directing sunlight onto a PV module 130. A concentrator 144 comprises the solar panel 102, actuators, measurement devices, and connections as shown within a borderline marked "concentrator 144" in FIG. 2. Electrical connections for carrying signals between the plurality of concentrators 144 and a node controller 108 in the example of FIG. 3 are made over a concentrator monitoring and control bus 146. The concentrator monitoring and control bus 146 in FIG. 3 includes the same electrical connections as appear in FIG. 2 between the node controller and elements within the concentrator 144 borderline.

It may be desirable to operate an intelligent node even when components in the intelligent node are not receiving sufficient electrical power from a PV module, for example at night, during cloudy conditions, or during maintenance or repair activities. Embodiments of a node controller may therefore optionally include an energy storage module such as a battery or a large capacitor and a charging circuit for replenishing energy drawn from the energy storage module. The node controller shown in the examples of FIGS. 1-3 includes an energy storage module 148 adapted to receive charging current and voltage from a charger 150. The charger 150 receives input voltage and current from a line electrically connected to the intelligent node output terminal 120 and converts the input voltage and input current to an output current and an output voltage suitable for recharging the energy storage module 148.

Figure 4:
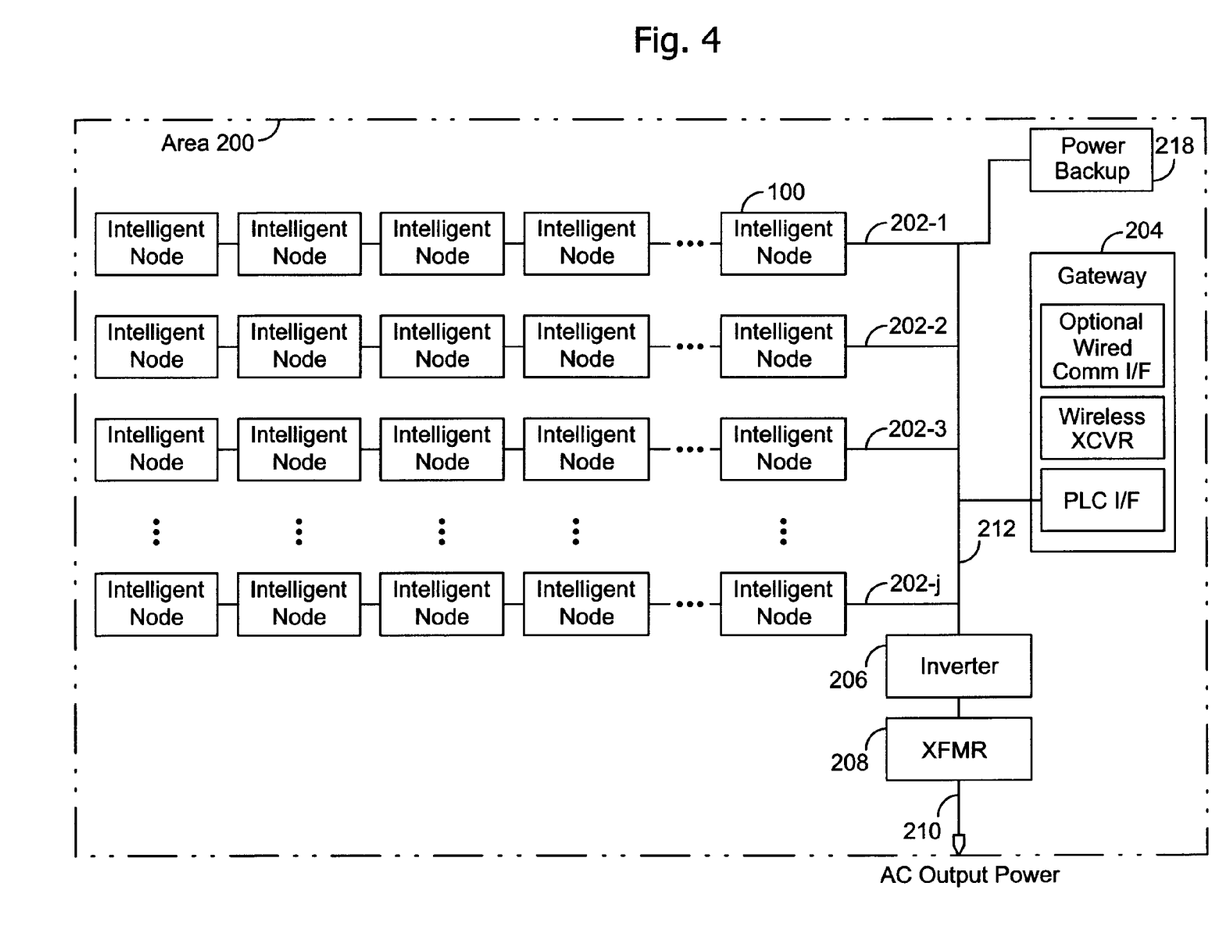

A solar power plant or other solar power generation application generally employs many intelligent nodes to achieve a preferred power generating capacity. In FIG. 4, a plurality of intelligent nodes 100 electrically connected in series, that is, with an output from an intelligent node connected to an input of an adjacent intelligent node, form a first chain of intelligent nodes 202-1. Another plurality of intelligent nodes comprises a second chain of intelligent nodes 202-2, a third chain 202-3, and so on until a desired number "j" of chains of intelligent nodes are made. Serial output lines from each of the "j" chains of intelligent nodes are connected in a parallel electrical configuration on an area power and data bus 212. The area power and data bus 212 is connected to an input of an inverter 206. An output of the inverter 206 is an input to a transformer (XFMR) 208, whose output on a power transmission line 210 comprises electrical power in the form of alternating current (AC) voltage and current.

FIG. 4 further illustrates a gateway 204 having a PLC interface for communicating with nodes and a wireless XCVR for communicating with nodes and a central server. The gateway 204 may further include an optional interface for communication with a central server over a communication cable, for example an electrical signal interface to a coaxial cable for carrying electrical communication signals or an optical signal interface for carrying communication signals over a fiber optic cable. The array of intelligent nodes 100, gateway 204, optional inverter 206, and optional transformer 208 together define boundaries of an area 200, in part because data and commands exchanged by PLC between network components in an area 200 are not coupled through the inverter 206 and transformer 208 to an output transmission line 210 from the area 200.

The PLC interface in the gateway 204 is electrically connected to an area power and data bus 212. A wireless XCVR in the gateway 204 provides another means of communication between the gateway 204 and the intelligent nodes in the area 200. The wireless XCVR and the PLC interface in the gateway 204 comprise redundant means of communication with the intelligent nodes in the area 200. The gateway 204 may further be adapted to exclude data and commands related to intelligent nodes in other areas.

It may be desirable to operate the intelligent nodes in an area when the PV modules in the area are not generating power, for example at night or during maintenance or repair activities. A power backup system may therefore be provided to enable operation of a gateway and associated intelligent nodes when the intelligent nodes are not sending power to the area power and data bus. A backup power system 218 connected to an area power and data bus 212 is shown in FIG. 4. A backup power system includes, for example but not limited to, a battery, an electrical generator, or a connection to the electric power transmission grid. The backup power system 218 may optionally be used to recharge an energy storage module in a node controller, for example the energy storage module 148 in FIGS. 1-3.

Figure 5:
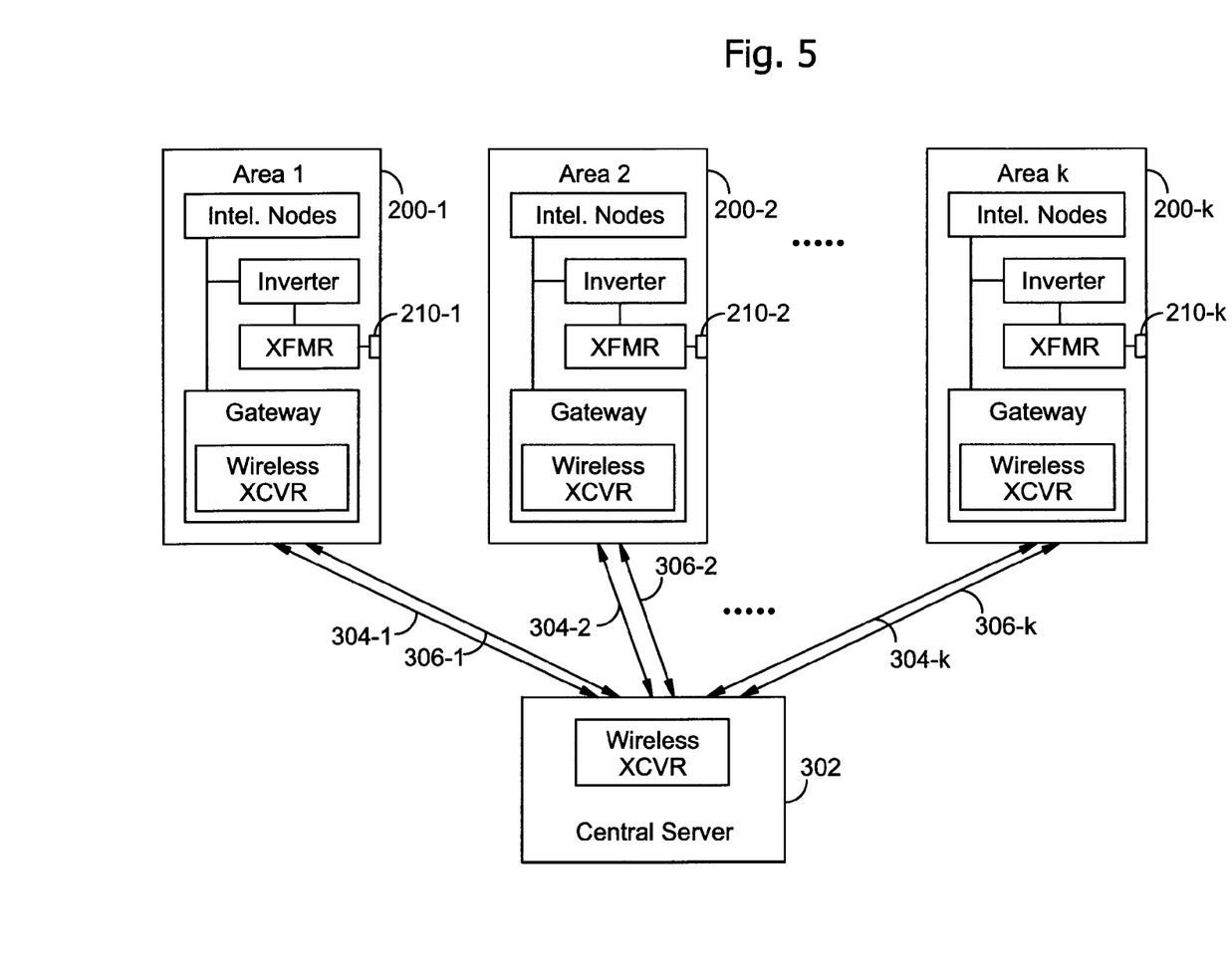
FIG. 5 is a block diagram of a network topology for monitoring and control of a large array of intelligent nodes organized into more than one area. A block denoting an area in the example of FIG. 5 is a simplified representation of the example of an area in FIG. 4.

A solar power generating application such as a solar power plant operated by a utility company may comprise more than one area. An example of a network topology for communications between intelligent nodes and gateways in a plurality of areas and a central server is shown in FIG. 5. In the example of FIG. 5, a selected number of areas "k" and a central server comprise a network topology in accord with an embodiment of the invention. In the example of FIG. 5, the network topology of area number 1 (200-1), area number 2 (200-2), and so on up for each area up to area number "k" (200-k), is the same as the topology for an area 200 shown in the example of FIG. 4. A central server 302 including a wireless XCVR communicates data and commands over a wireless communications channel (304-1, 304-2, . . . 304-k) to each area (200-1, 200-2, . . . , 200-k). Data and commands to be transmitted and received by network elements may optionally follow a selected network communications protocol known in the art.

A second, optional means of communication may also be included in network connections between each area and the central server of FIG. 3 to provide redundant means of communication. For example, a communication cable (306-1, 306-2, . . . 306-k) may optionally connect the central server 302 to each of the areas (200-1, 200-2, . . . 200-k). The communication cable may comprise optical fiber technology or conventional coaxial cable for electrical signals, according to the needs of a particular application. A power output (210-1, 210-2, . . . 210-k) from each area (200-1, 200-2, . . . 200-k) may optionally be combined by equipment not shown to form a power output from the solar power plant of FIG. 3.

A network topology having at least two redundant means of communication, as in the embodiments of FIGS. 1-5, is able to monitor and control a plurality of intelligent nodes even if one or more nodes are bypassed by activation of the bypass bus in an intelligent node or if one of the redundant means of communications fails. Redundant means of communication therefore increase network reliability. Commands and data may optionally be sent redundantly over both means of communication or one means of communication may be used until a communication fault occurs and the network switches locally to an alternative means of communication. Switching to an alternative means of communication may alternatively be done by a central server, a gateway, or autonomously by an intelligent node. For example, should adjacent intelligent nodes be unable to communicate via the PLC system, a gateway or a central server could direct the nodes to communicate over the wireless system. Or, a node controller in an intelligent node could optionally be configured to autonomously seek a new communication pathway should a network pathway already in use become unavailable. Methods for managing fault-tolerant communications in a network topology having redundant means of communication will be well known to one skilled in the art of network communications.

Unless expressly stated otherwise herein, ordinary terms have their corresponding ordinary meanings within the respective contexts of their presentations, and ordinary terms of art have their corresponding regular meanings.

What is claimed is:

1. A network topology for monitoring and controlling a plurality of solar panels, comprising an intelligent node comprising:
   an intelligent node input terminal for receiving current and voltage output from a photovoltaic module on another intelligent node;
   a bypass relay comprising a first switched terminal, a second switched terminal, and an output terminal;
   a PV module having an input electrically connected to said intelligent node input terminal and an output electrically connected to said first switched terminal on said bypass relay;
   an intelligent node output terminal electrically connected to said output terminal on said bypass relay;
   at least two redundant means of communication configured for exchanging data and commands between at least two of said intelligent node in a communications network;
   a bypass bus electrically connected to said intelligent node input terminal and to said bypass relay second switched terminal; and
   a node controller comprising:
      a relay control line electrically connected to a control input on said bypass relay;
      a first electrical connection from said node controller to a first of said two redundant means of communication; and
      a second electrical connection from said node controller to a second of said two redundant means of communication;
   wherein said node controller autonomously selects one of said two redundant means of communication when the other of said two redundant means of communication is not available for communication, said bypass relay selects said bypass bus when said node controller receives a bypass command from either of said two redundant means of communication, thereby electrically disconnecting said PV module output from said intelligent node output terminal and routing signals received at said intelligent node input terminal to said intelligent node output terminal.

2. The network topology for monitoring and controlling a plurality of solar panels of claim 1, wherein a first of said redundant means of communication comprises a wireless transceiver.

3. The network topology for monitoring and controlling a plurality of solar panels of claim 2, wherein a second of said redundant means of communication comprises a circuit for exchange of data and commands over a power line.

4. The network topology for monitoring and controlling a plurality of solar panels of claim 3, wherein said intelligent node further comprises a solar panel.

5. The network topology for monitoring and controlling a plurality of solar panels of claim 1, wherein said node controller is adapted for controlling a position of said solar panel and said node controller further comprises a plurality of electrical signal input terminals and a plurality of electrical signal output terminals for transmitting and receiving data and commands.

6. The network topology for monitoring and controlling a plurality of solar panels of claim 5, wherein said node controller further comprises:
   a battery; and
   a charger electrically connected to said battery and to said intelligent node output terminal, said charger adapted to convert an output voltage from said PV panel to a voltage for charging said battery.

7. The network topology for monitoring and controlling a plurality of solar panels of claim 5, further comprising a device for measuring voltage having a first output terminal electrically connected to one of said plurality of electrical signal input terminals on said node controller, wherein said device for measuring voltage is adapted to measure an output voltage from said PV module and to output a signal related to a measurement of voltage on said first output terminal.

8. The network topology for monitoring and controlling a plurality of solar panels of claim 5, further comprising a device for measuring current having a second output terminal electrically connected to one of said plurality of electrical signal input terminals on said node controller, wherein said device for measuring current is adapted to measure an output current from said PV module and to output a signal related to a measurement of current on said second output terminal.

9. The network topology for monitoring and controlling a plurality of solar panels of claim 5, further comprising a device for measuring temperature having an output terminal electrically connected to one of said plurality of electrical signal input terminals on said node controller, wherein said device for measuring temperature is adapted to read a temperature of said PV module.

10. The network topology for monitoring and controlling a plurality of solar panels of claim 5, further comprising a device for measuring an intensity of sunlight having an output terminal electrically connected to one of said plurality of electrical signal input terminals on said node controller.

11. The network topology for monitoring and controlling a plurality of solar panels of claim 5, further comprising a device for measuring surface cleanliness having an output terminal electrically connected to one of said plurality of electrical signal input terminals on said node controller.

12. The network topology for monitoring and controlling a plurality of solar panels of claim 5, further comprising a device for measuring reflectance having an output terminal electrically connected to one of said plurality of electrical signal input terminals on said node controller.

13. The network topology for monitoring and controlling a plurality of solar panels of claim 5, further comprising a device for measuring azimuth angle having an output terminal electrically connected to one of said plurality of electrical signal input terminals on said node controller.

14. The network topology for monitoring and controlling a plurality of solar panels of claim 5, further comprising a device for measuring elevation angle having an output terminal electrically connected to one of said plurality of electrical signal input terminals on said node controller.

15. The network topology for monitoring and controlling a plurality of solar panels of claim 5, further comprising:
an elevation motor rotationally coupled to said solar panel, wherein said elevation motor has a control input; and
a first motor control output terminal on said node controller, wherein said first motor control output terminal is electrically connected to said elevation motor control input.

16. The network topology for monitoring and controlling a plurality of solar panels of claim 15, further comprising:
an azimuth motor rotationally coupled to said solar panel, wherein said azimuth motor has a control input; and
a second motor control output terminal on said node controller, wherein said second motor control output terminal is electrically connected to said azimuth motor control input.

17. The network topology for monitoring and controlling a plurality of solar panels of claim 16, wherein a concentrator comprises said solar panel, said azimuth motor, and said elevation motor, and further comprising at least one additional of said concentrator electrically connected to said node controller.

18. The network topology for monitoring and controlling a plurality of solar panels of claim 5, wherein said node controller may alternatively receive data and commands from said first redundant means of communication, said second redundant means of communication, or from both of said first and said second means of communication.

19. The network topology for monitoring and controlling a plurality of solar panels of claim 18, further comprising a chain of nodes comprising at least two of said intelligent nodes electrically connected in series.

20. The network topology for monitoring and controlling a plurality of solar panels of claim 19, further comprising a gateway having a wireless transceiver adapted for exchange of data and commands with said wireless transceiver in said intelligent node and a circuit for power line communication adapted for exchange of data and commands with said circuit for power line communication in said intelligent node.

21. The network topology for monitoring and controlling a plurality of solar panels of claim 20, further comprising:
an area power and data bus electrically connected to said gateway and to said chain of nodes; and
an area comprising said area power and data bus, said gateway, and said chain of nodes.

22. The network topology for monitoring and controlling a plurality of solar panels of claim 21, further comprising a power backup system electrically connected to said area power and data bus.

23. The network topology for monitoring and controlling a plurality of solar panels of claim 21, wherein said area further comprises an inverter having an input electrically connected to said area power and data bus and an inverter output.

24. The network topology for monitoring and controlling a plurality of solar panels of claim 23, wherein said area further comprises a transformer having an input electrically connected to said inverter output.

25. The network topology for monitoring and controlling a plurality of solar panels of claim 24, wherein said area further comprises more than one of said chain of nodes electrically connected to said area power and data bus.

26. The network topology for monitoring and controlling a plurality of solar panels of claim 24, further comprising a central server having a wireless transceiver adapted for communication with said gateway.

27. The network topology for monitoring and controlling a plurality of solar panels of claim 26, further comprising at least two of said redundant means of communication for exchanging data and commands between said area and said central server.

28. The network topology for monitoring and controlling a plurality of solar panels of claim 27, comprising at least two of said area.

29. The network topology for monitoring and controlling a plurality of solar panels of claim 1, wherein said intelligent node is electrically connected to and configured for monitoring and controlling more than one solar panel.

30. The network topology for monitoring and controlling a plurality of solar panels of claim 5, wherein said node controller is electrically connected to and configured for monitoring and controlling more than one solar panel.

31. An apparatus, comprising:
an intelligent node comprising:
an intelligent node input terminal for receiving current and voltage output from another of said intelligent node;
a bypass relay comprising a first switched terminal, a second switched terminal, and an output terminal;
an intelligent node output terminal electrically connected to said output terminal on said bypass relay;
at least two redundant means of communication configured for exchanging data and commands between at least two of said intelligent node in a communications network;
a bypass bus electrically connected to said intelligent node input terminal and to said bypass relay second switched terminal; and
a node controller comprising:
a relay control line electrically connected to a control input on said bypass relay;
a first electrical connection from said node controller to a first of said two redundant means of communication; and
a second electrical connection from said node controller to a second of said two redundant means of communication,
wherein said node controller autonomously selects one of said two redundant means of communication when the other of said two redundant means of communication is not available for communication, said bypass relay selects said bypass bus when node controller receives a bypass command from either of said two redundant means of communication, thereby electrically connecting signals received at said intelligent node input terminal to said intelligent node output terminal.

* * * * *